(12) United States Patent
Yasukochi (10) Patent No.: US 8,830,370 B2
(45) Date of Patent: Sep. 9, 2014

(54) IMAGE PROCESSING DEVICE AND IMAGE PROCESSING METHOD

(75) Inventor: Makoto Yasukochi, Kanagawa (JP)

(73) Assignee: Sony Corporation, Tokyo (JP)

( * ) Notice: Subject to any disclaimer, the term of this patent is extended or adjusted under 35 U.S.C. 154(b) by 173 days.

(21) Appl. No.: 13/403,033

(22) Filed: Feb. 23, 2012

(65) Prior Publication Data

US 2012/0242879 A1    Sep. 27, 2012

(30) Foreign Application Priority Data

Mar. 24, 2011   (JP) ................................. 2011-065825

(51) Int. Cl.
  *H04N 3/14*    (2006.01)
  *H04N 5/335*   (2011.01)
  *H04N 5/365*   (2011.01)
  *H04N 5/369*   (2011.01)
  *H04N 5/357*   (2011.01)

(52) U.S. Cl.
  CPC ........... *H04N 5/3698* (2013.01); *H04N 5/3658* (2013.01); *H04N 5/357* (2013.01)
  USPC .......................... 348/308; 250/208.1; 257/292

(58) Field of Classification Search
  USPC .......................... 348/308; 257/292; 250/208.1
  See application file for complete search history.

(56) References Cited

FOREIGN PATENT DOCUMENTS

| JP | 2009225021 | * 3/2008 | ............. H04N 5/335 |
| JP | 2009-225021 | 10/2009 | |

* cited by examiner

*Primary Examiner* — Paul Berardesca (74) *Attorney, Agent, or Firm* — Rader, Fishman & Grauer PLLC (57) ABSTRACT

An image processing device includes: a first storage unit storing electric charges outputted from a photodiode; a reset unit resetting a voltage stored in the first storage unit; a transfer unit transferring electric charges outputted from the photodiode to the first storage unit; a switching unit switching a DC voltage supplied from a supply line of a pixel power source; an output unit outputting the voltage stored in the first storage unit to a signal output line; a second storage unit storing the DC voltage supplied through the switching unit; and a drive unit driving the output unit by receiving the DC voltage stored by the second storage unit as a power source.

15 Claims, 7 Drawing Sheets

FIG.4A CONTROL SIGNAL RST

FIG.4B CONTROL SIGNAL TRG

FIG.4C CONTROL SIGNAL SEL

FIG.4D CONTROL SIGNAL SW

IMAGE PROCESSING DEVICE AND IMAGE PROCESSING METHOD

FIELD

The present disclosure relates to an image processing device and an image processing method, and particularly relates to an image processing device and an image processing method capable of suppressing variation in power supply voltage as well as suppressing occurrence of streaking.

BACKGROUND

In a digital camera, an object is imaged by a CMOS image sensor and a taken image is stored or displayed.

When noise is superimposed on the power supply voltage in the CMOS image sensor, a signal level readout from an output signal line is affected. Accordingly, a technique for suppressing such voltage variation is proposed (for example, JP-A-2009-225021 (Patent Document 1)).

Figure 1:
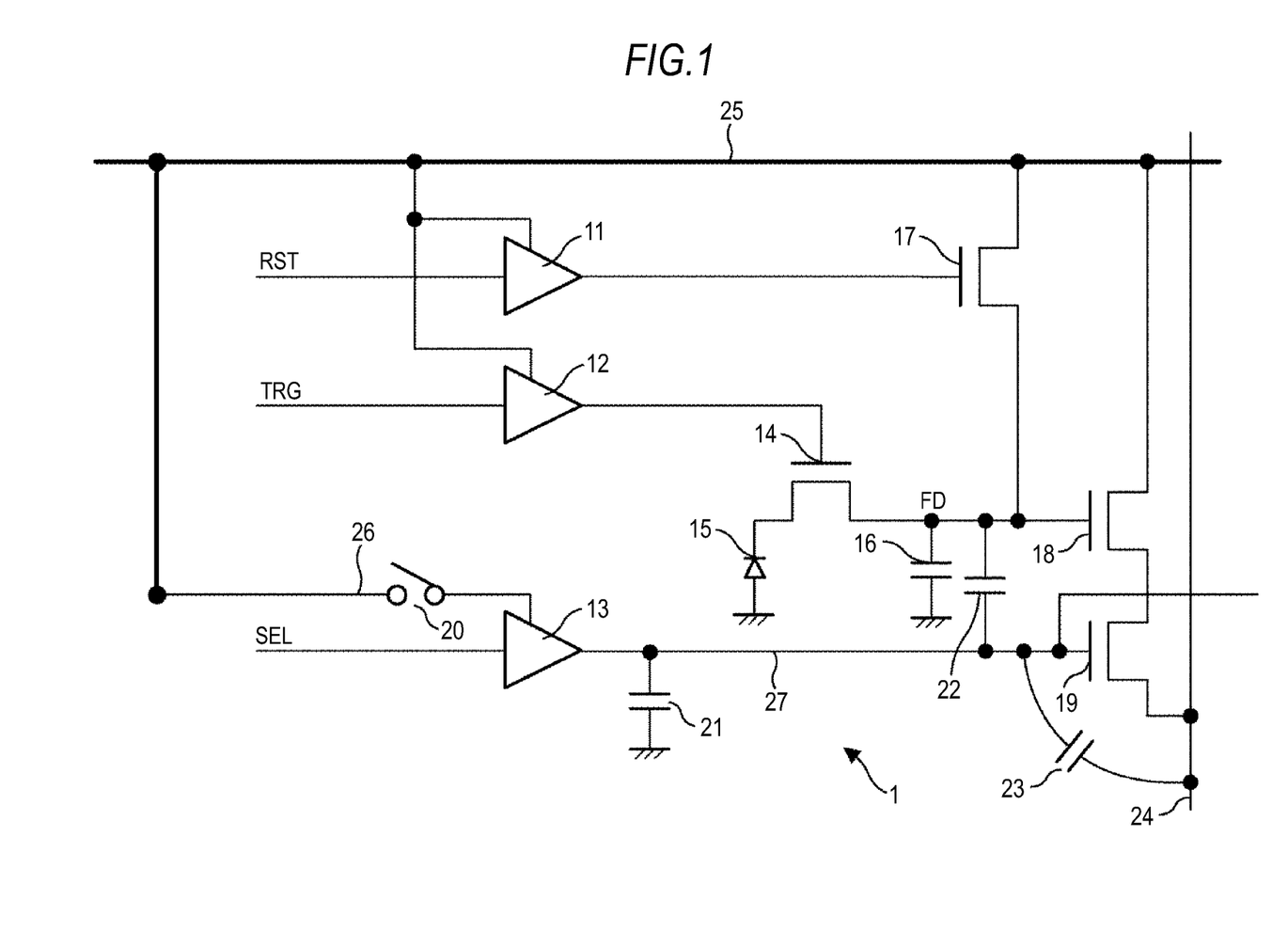
FIG. 1 is a diagram showing a configuration of an image sensor in related art.

FIG. 1 is a diagram showing a configuration of an image sensor in related art. Only one pixel is shown in a CMOS image sensor 1. Necessary power is supplied to a RST driver 11 and a TRG driver 12 from a pixel power line 25. Necessary power is supplied to a SEL driver 13 from a SEL driver power line 26 connected to the pixel power line 25 through a switch 20.

In order to prevent variation, a voltage of a capacitor 16 to which a voltage of a photodiode 15 is transferred is read out just after reset and at a timing when a given period of time has passed after the reset, and the voltage difference will be a pixel signal outputted from the photodiode 15.

When the voltage of the capacitor 16 is reset, the RST driver 11 turns on a FET (Field Effect Transistor) 17 at a timing when a control signal RST is inputted and clamps the voltage of the capacitor 16 at a reference voltage. At this time, the SEL driver 13 drives a FET 19 through a SEL line 27 in accordance with a control signal SEL, therefore, the voltage of the capacitor 16 is amplified by a FET 18 and outputted to a signal output line 24 through the FET 19.

The photodiode 15 generates electric charges corresponding to a light receiving amount from an object incident on the photodiode 15 after that. When a control signal TRG is inputted at a given timing, the TRG driver 12 turns on the FET 14 and transfers the electric charges of the photodiode 15 to the capacitor 16. At this time, the voltage of the capacitor 16 is amplified by the FET 18 and outputted to the signal output line 24 through the FET 19.

When voltage variation occurs in the pixel power line 25 due to some reason in the case where the switch 20 is in an on state, the variation is transmitted to the SEL line 27 through the SEL driver 13 and further transmitted to a charge storage unit FD through a parasitic capacitance 22. Then, the variation is outputted to the signal output line 24 through the FETs 18 and 19. The variation is also transmitted also through a stray capacitance 23. The voltage variation is transmitted to the signal output line 24 in this manner.

In order to prevent the above, the switch 20 is turned off at a timing when the voltage of the capacitor 16 is read out. As a result, a potential of the SEL line 27 is in a floating state at a high level and voltage variation can be suppressed. That is, PSRR (power supply rejection ratio) can be improved.

SUMMARY

However, when the above switching is performed, the SEL line 27 is in the floating state and streaking occurs. Namely, when voltage variation of the SEL line 27 is transmitted to the charge storage unit FD through the parasitic capacitance 22, voltage variation occurring in the charge storage unit FD and the signal output line 24 of a certain pixel is transmitted to the charge storage unit FD and the signal output line 24 of another pixel connected to the pixel through the SEL line 27, which gives an error to an original voltage of the charge storage unit FD and the signal output line 24 of another pixel. That is, voltage variation occurs due to the switching, therefore, streaking occurs.

In view of the above, it is desirable to suppress variation in power supply voltage as well as to suppress the occurrence of streaking.

An embodiment of the present disclosure is directed to an image processing device including a first storage unit storing electric charges outputted from a photodiode, a reset unit resetting a voltage stored in the first storage unit, a transfer unit transferring electric charges outputted from the photodiode to the first storage unit, a switching unit switching a DC voltage supplied from a supply line of a pixel power source, an output unit outputting the voltage stored in the first storage unit to a signal output line, a second storage unit storing the DC voltage supplied through the switching unit, and a drive unit driving the output unit by receiving the DC voltage stored by the second storage unit as a power source.

The switching unit may be turned off before the reset is performed by the reset unit in a state of storing the DC voltage supplied from the supply line of the pixel power source and may be turned on after the output of the voltage stored by the first storage unit to the signal output line is completed by the output unit.

The image processing device may be a CMOS image sensor.

Another embodiment of the present disclosure is directed to an image processing method including allowing a first storage unit to store electric charges outputted from a photodiode, allowing the reset unit to reset a voltage stored in the first storage unit, allowing a transfer unit to transfer electric charges outputted from the photodiode to the first storage unit, allowing a switching unit to switch a DC voltage supplied from a supply line of a pixel power source, allowing an output unit to output the voltage stored in the first storage unit to a signal output line, allowing a second storage unit to store the DC voltage supplied through the switching unit, and allowing a drive unit to drive the output unit by receiving the DC voltage stored by the second storage unit as a power source.

The image processing method according to the embodiment of the present disclosure is an image processing method corresponding to the image processing device according to the embodiment of the present disclosure.

As described above, it is possible to suppress variation in power supply voltage as well as to suppress the occurrence of streaking according to the embodiment of the present disclosure.

DETAILED DESCRIPTION

Hereinafter, a mode (hereinafter, referred to as an embodiment) for carrying out the technique will be explained.

Figure 2:
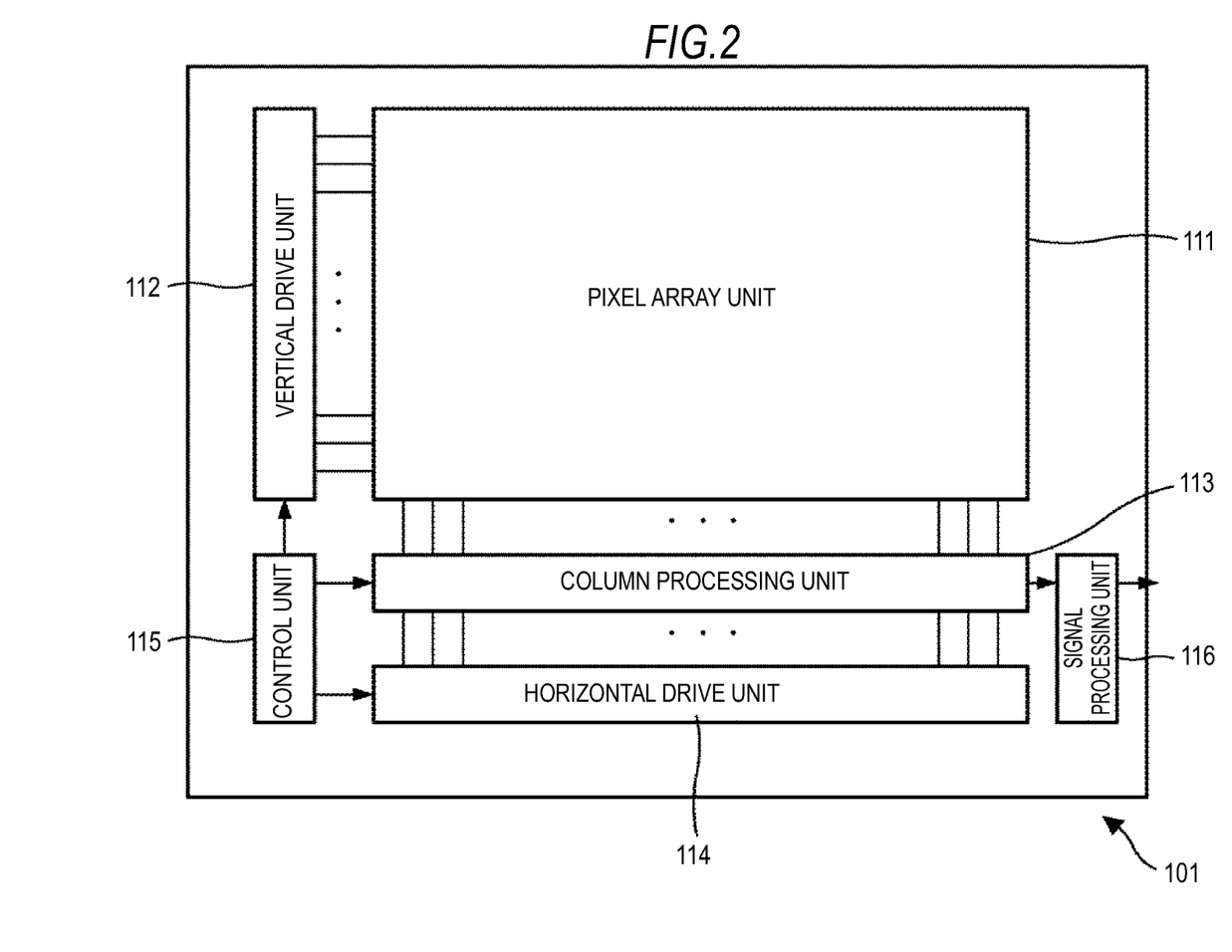
FIG. 2 is a diagram showing a configuration of a CMOS image sensor according to an embodiment of the present disclosure.

FIG. 2 is a diagram showing a configuration of a CMOS image sensor 101. The CMOS (Complementary Metal Oxide Semiconductor) image sensor 101 includes a pixel array unit 111, a vertical drive unit 112, a column processing unit 113, a horizontal drive unit 114, a control unit 115 and a signal processing unit 116.

The pixel array unit 111 includes plural pixels arranged in a horizontal direction as well as in a vertical direction. Light from an object is photoelectrically converted by these pixels. The vertical drive unit 112 selects and drives each line in which plural pixels are arranged. The horizontal drive unit 114 selects and drives prescribed pixels in the vertical direction of each line. The column processing unit 113 holds pixel data read out from the selected pixels and supplies the data to the signal processing unit 116. The control unit 115 controls operations of the units. The signal processing unit 116 processes pixel data read out from the column processing unit 113. The vertical drive unit 112 conducts control of a SEL driver 163 described hereinbelow.

Figure 3:
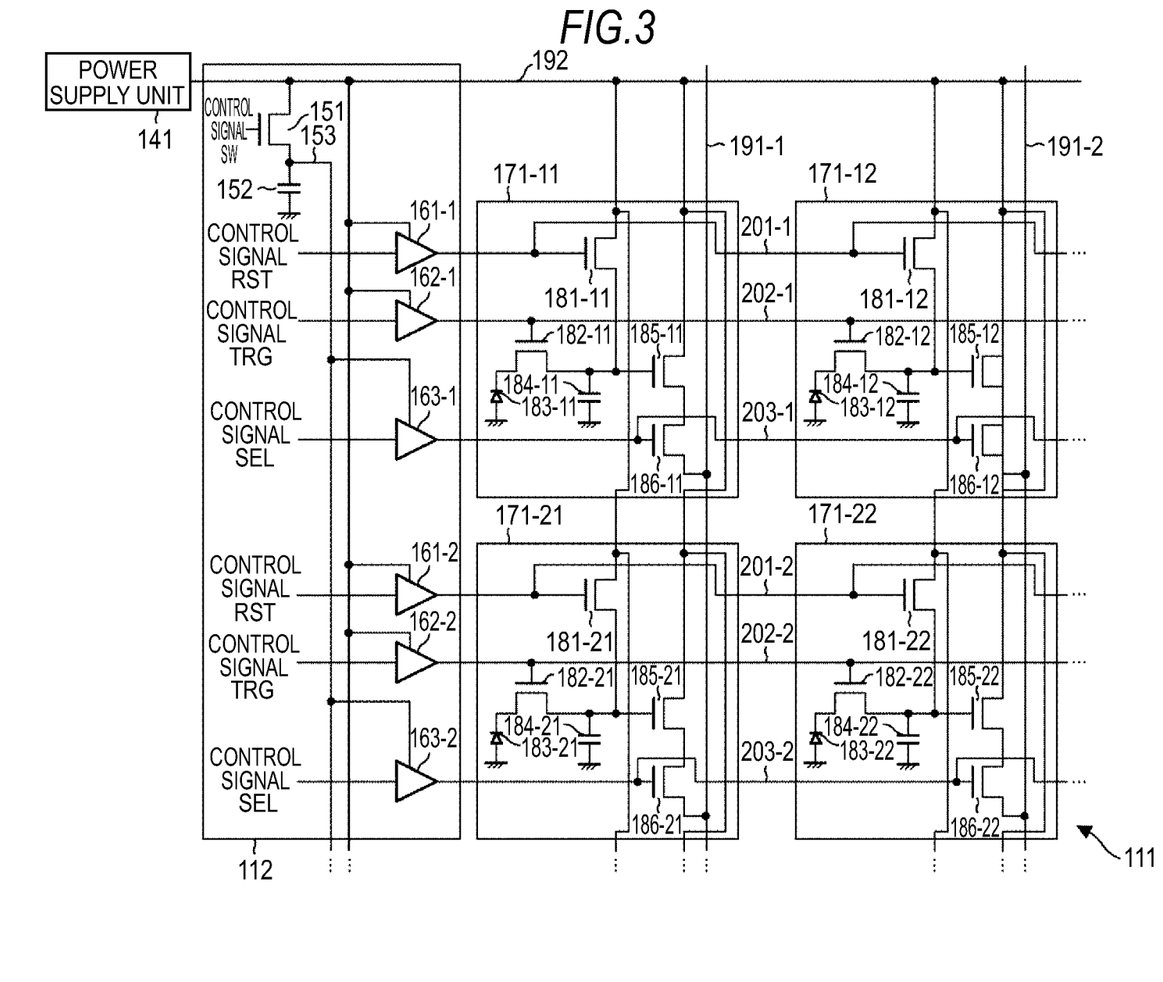
FIG. 3 is a diagram showing configurations of a pixel array unit and a vertical drive unit.

FIG. 3 is a diagram showing configurations of the pixel array unit 111 and the vertical drive unit 112. In the pixel array unit 111, m×n pieces of pixels 171-$ij$ (i=1, 2, ..., m, j=1, 2, ..., n) are arranged. That is, a pixel 171-11, 171-12, ..., and 171-1$n$ are arranged in the first row as well as pixels 171-21, 171-22, ..., and 171-2$n$ are arranged in the second row. In the same manner, pixels 171-m1, 171-m2, ..., and 171-mn are arranged in the m-th row. In FIG. 3, only 2×2 pieces of pixels are shown. In the case where it is not necessary that pixels 171-$ij$ are individually distinguished, the pixel will be written as merely the pixel 171. The same applies to other components.

In the pixel 171-11, connection is made so that electric charges in a photodiode 183-11 are transferred to a capacitor 184-11 through a FET 182-11 as a transfer unit. A charge storage unit FD of the capacitor 184-11 as a storage unit is connected to a pixel power line 192 through a FET 181-11 as a reset unit as well as connected to a gate of a FET 185-11. One terminal of the FET 185-11 is connected to the pixel power line 192 and the other terminal is connected to a signal output line 191-1 through a FET 186-11 as an output unit.

DC power is supplied from power supply unit 141 to the pixel power line 192. The power supply unit 141 includes a battery or a circuit for rectifying and smoothing AC power as well as a capacitor for stabilizing voltage.

An output of a RST driver 161-1 is connected to a gate of the FET 181-11 through a RST line 201-1. An output of a TRG driver 162-1 is connected to a gate of the FET 182-11 through a TRG line 202-1. An output of a SEL driver 163-1 as a drive unit is connected to a gate of the FET 186-11 through a SEL line 203-1. Power is supplied from the pixel power line 192 to the RST driver 161-1 and the TRG driver 162-1.

A capacitor 152 as a storage unit is configured to be charged by the pixel power line 192 through a FET 151 as a switching unit. The FET 151 is controlled by a control signal SW. As for the power of the SEL driver 163-1, DC power of the capacitor 152 is supplied through a SEL driver power line 153.

The RST driver 161-1 controls the FET 181-11 by a control signal RST to be inputted, the TRG driver 162-1 controls the FET 182-11 by a control signal TRG to be inputted and the SEL driver 163-1 controls the FET 186-11 by a control signal SEL to be inputted.

Other pixels 171-$ij$ are configured in the similar manner though the explanation is omitted.

Next, operations of the vertical drive unit 112 and the pixel array unit 111 will be explained with reference to FIGS. 4A to 4D.

FIGS. 4A to 4D are timing charts for explaining operations. The vertical drive unit 112 allows the control signal SW to be in a high level (FIG. 4D) before reading out a pixel signal. When the control signal SW is in the high level, the FET 151 is turned on and the capacitor 152 is charged from the pixel power line 192. Accordingly, the capacitor 152 stores power necessary for driving the SEL driver 163. In other words, the capacitor 152 has a capacitance for storing the power necessary for driving the SEL driver 163. That is, it is difficult to form the capacitor 152 by a simple parasitic capacitance. It is necessary to positively apply the capacitor as one component. The capacitor will be described later.

Figure 4A:
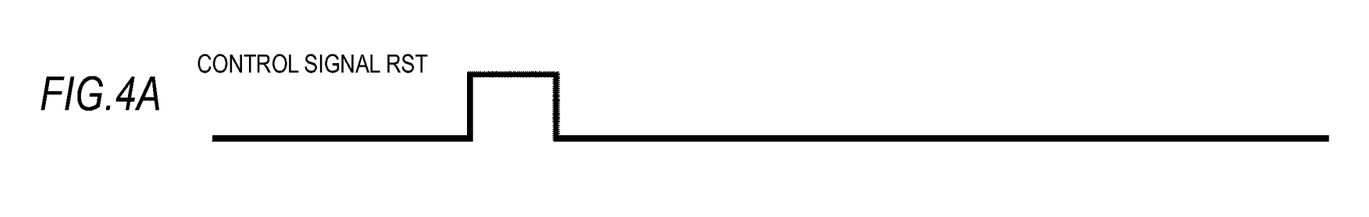
FIGS. 4A to 4D are timing charts for explaining operations.
Figure 4B:
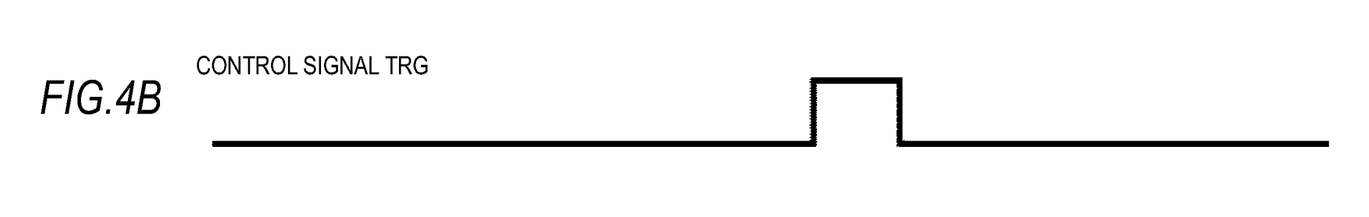
Figure 4C:
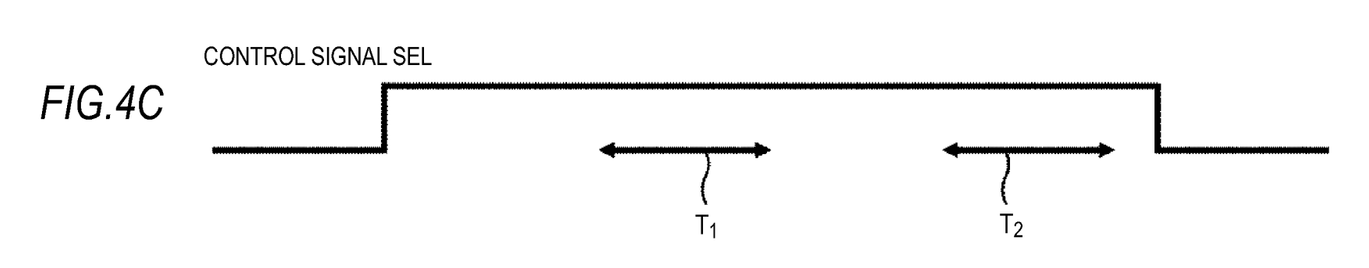
Figure 4D:
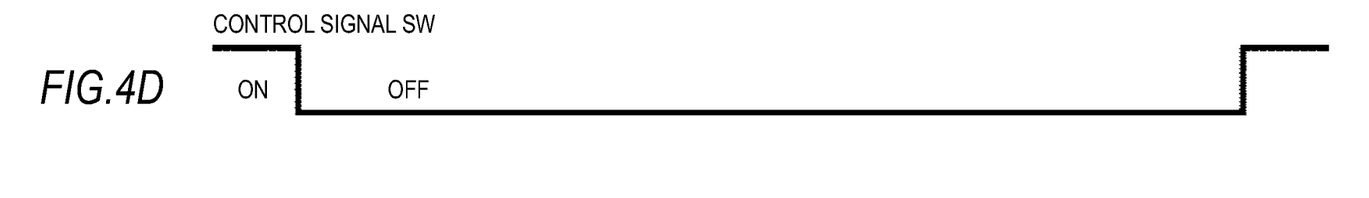

When the image signal is read out, the vertical drive unit 112 changes the control signal SW from the high level to a low level (FIG. 4D). Accordingly, the FET 151 is turned off and the power source of the SEL driver 163 is cut off from the pixel power line 192. Therefore, when voltage variation occurs at the pixel power line 192, the variation is not transmitted to the SEL line 203 as the output destination of the SEL driver 163. As the result, PSRR can be improved.

Furthermore, after the control signal SW is switched from the high level to the low level, the vertical drive unit 112 changes the control signal SEL from the low level to the high level (FIG. 4C). Accordingly, the FET 186 is turned on, which allows the voltage of the charge storage unit FD to be read out.

After the control signal SEL is changed from the low level to the high level, the vertical drive unit 112 outputs the control signal RST in a high level for a fixed period of time (FIG. 4A). Accordingly, the FET 181 is turned on by the RST driver 161 and the capacitor 184 is reset by the voltage of the pixel power line 192. The voltage of the capacitor 184 is amplified by the FET 185 in a subsequent period $T_1$ and read out to the signal output line 191 through the FET 186 as a P-phase signal.

The level of the P-phase signal read out to the signal output line 191 is A/D converted by a not-shown A/D converter and read out to the column processing unit 113, then, transferred to the signal processing unit 116 by the horizontal drive unit 114.

After the read-out of the level of the P-phase signal is completed, the vertical drive unit 112 outputs the control signal TRG in the high level for a fixed period of time (FIG. 4B). Accordingly, the TRG driver 162 turns on the FET 182, thereby transferring electric charges in the photodiode 183 to the capacitor 184. That is, a voltage corresponding to the incident amount of light obtained in a period from the completion of the read-out of the P-phase signal to the output of the control signal TRG is stored in the capacitor 184.

The voltage of the capacitor 184 is amplified by the FET 185 in a subsequent period $T_2$ and read out to the signal output line 191 through the FET 186 as a D-phase signal.

The level of the D-phase signal read out to the signal output line 191 is A/D converted by a not-shown A/D converter and read out to the column processing unit 113, then, transferred to the signal processing unit 116 by the horizontal drive unit 114.

The signal processing unit 116 calculates the difference between the level of the P-phase signal and the level of the D-phase signal to be used as an image signal.

When the read-out of the D-phase signal is completed, the vertical drive unit 112 changes the control signal SEL from the high level to the low level (FIG. 4C). Accordingly, the FET 186 is turned off.

After the control signal SEL is changed from the high level to the low level, the vertical drive unit 112 changes the control signal SW from the low level to the high level (FIG. 4D). Accordingly, the FET 151 is turned on and the capacitor 152 is charged by the pixel power line 192 again.

Figure 5:
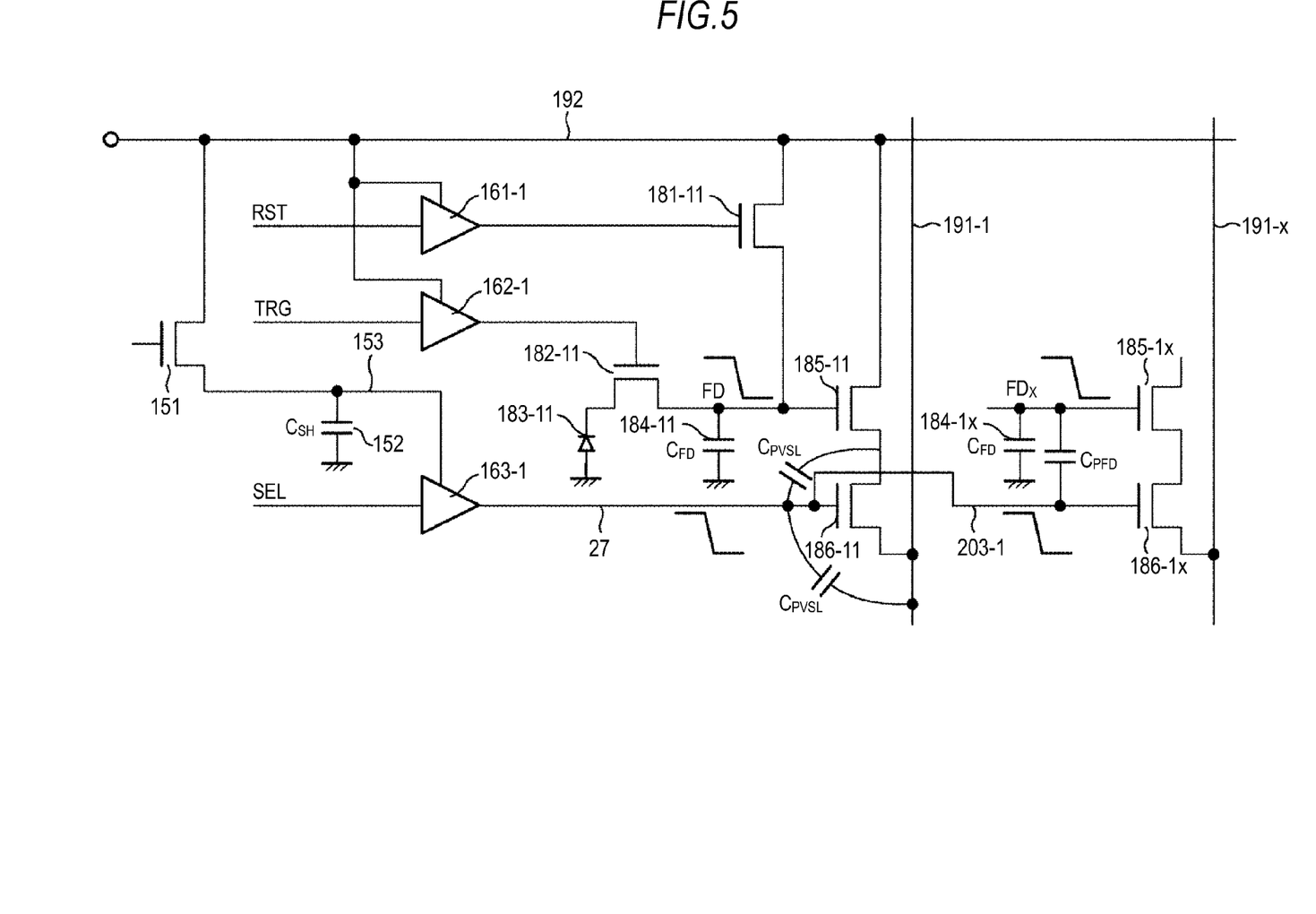
FIG. 5 is a diagram for explaining suppression of streaking.

Next, suppression of streaking will be explained with reference to FIG. 5. FIG. 5 is a diagram for explaining suppression of streaking.

Here, let us consider that the streaking as an error to be received by a certain charge storage unit FDx connected to the SEL line 203-1 in a selected state when potentials of all charge storage units FD other than the charge storage unit FDx itself change.

In FIG. 5, $C_{PVSL}$ is a parasitic capacitance generated between the SEL line 203-1 and the signal output line 191-1 and $C_{SH}$ is a capacitance of the capacitor 152 supplying power to the SEL driver 163-1. $C_{PFD}$ is a parasitic capacitance generated between the SEL line 203-1 and the charge storage unit FD and $C_{FD}$ is a capacitance of the capacitor 184 of the charge storage unit FD.

For example, voltage variation occurring at the signal output line 191-1 is transmitted to the SEL line 203-1 through the parasitic capacitance $C_{PVSL}$. Additionally, voltage variation occurring at the charge storage unit FD is transmitted to the SEL line 203-1 through the FET 185-11 and the parasitic capacitance $C_{PVSL}$. Voltage variation occurring at the SEL line 203-1 is transmitted to the charge storage unit FDx through the parasitic capacitance $C_{PFD}$.

Figure 6:
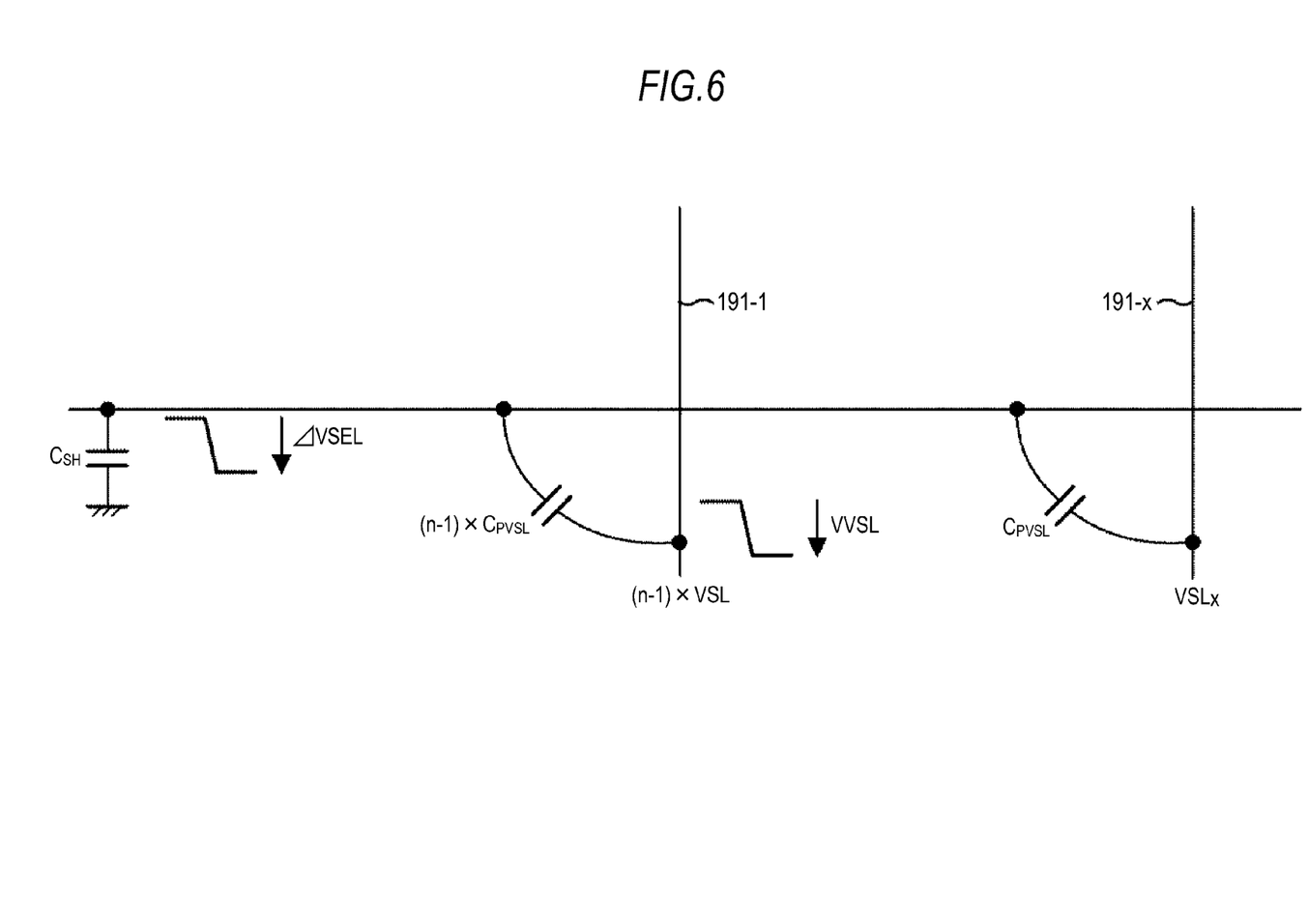
FIG. 6 is a diagram for explaining an expression.
Figure 7:
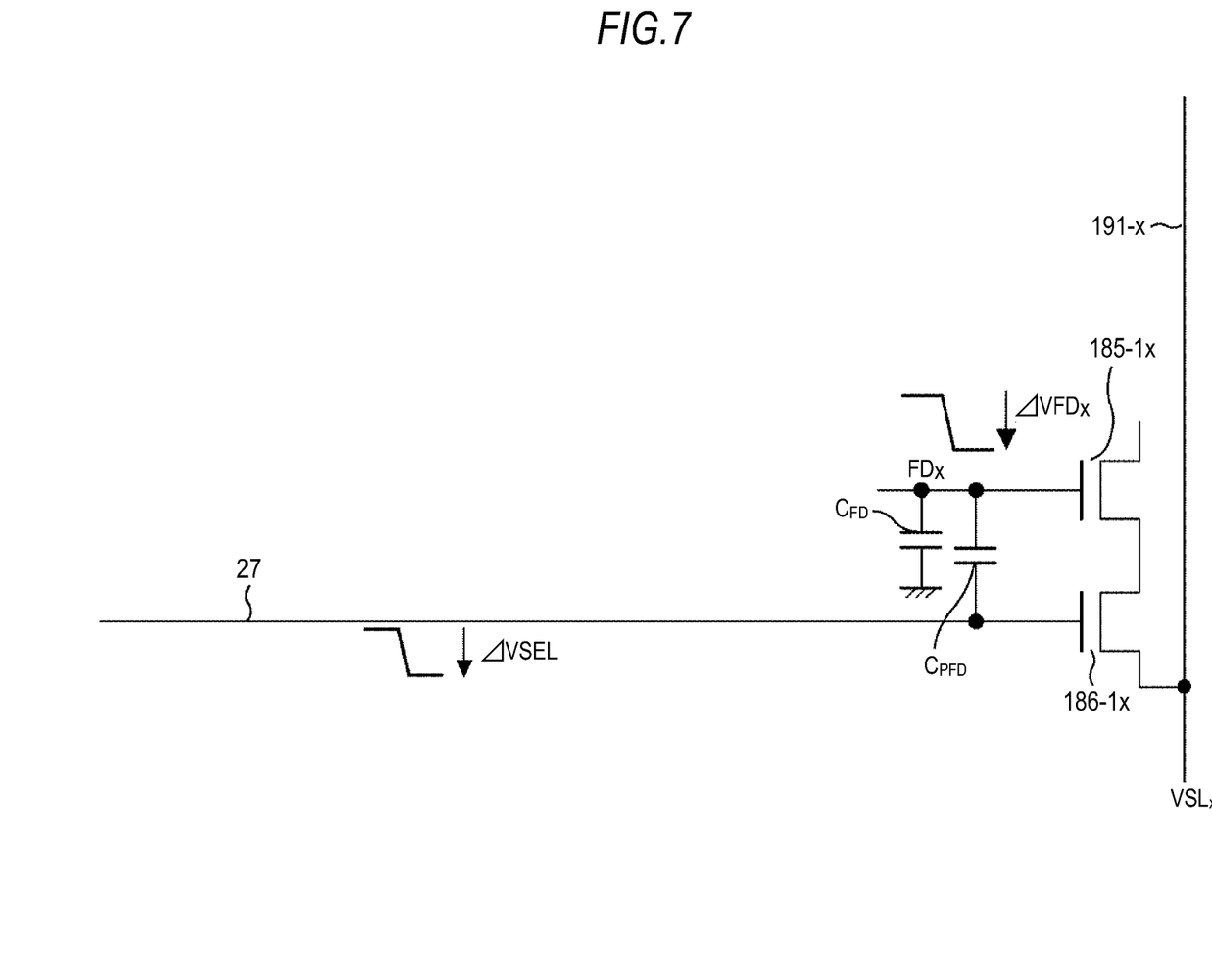
FIG. 7 is a diagram for explaining an Expression.

When the number of signal output lines is "n", a potential variation of signal output lines 191-$i$ ($i$=1, 2, . . . , x−1, x+1, . . . , n) to which pixels other than a pixel 171-1$x$ are connected is $V_{VSL}$, a potential variation $\Delta V_{SEL}$ of the SEL line 203-1 and a potential variation $\Delta V_{FDX}$ received by the charge storage unit $FD_X$ of the pixel 171-1$x$ are represented by the following expression. FIG. 6 is a diagram for explaining Expression (1) and FIG. 7 is a diagram for explaining Expression (2).

$$\Delta V_{SEL}=V_{VSL}\times((n-1)\times C_{PVSL})/(C_{SH}+n\times C_{PVSL}) \quad (1)$$

$$\Delta V_{FDX}=\Delta V_{SEL}\times C_{PFD}/(C_{FD}+C_{PFD}) \quad (2)$$

Here, assume that $C_{FD}$=10[F], $C_{PFD}$=1f[F], $C_{PVSL}$=1f[F], $V_{VSL}$=1[V], n=1000. In this case, in order to suppress $\Delta V_{FDX}$ to 1/1000 or less with respect to $V_{VSL}$, a capacitance of 89.2 p [F] or more will be necessary for $C_{SH}$.

As described above, it is possible to suppress the streaking by connecting the capacitor 152 to the SEL driver power line 153. As a large capacitance is necessary, it is difficult to form the capacitor 152 by a parasitic capacitance, and it is necessary to form the capacitor as independent one component.

It is also possible to suppress the streaking by connecting the capacitors 152 to respective SEL lines 203-1 to 203-$m$ respectively. However, when such connection is performed, not only excessive load is applied to each SEL driver 163 but also the number of capacitors is increased and the large area is necessary, therefore, it is difficult to practically realize the connection. Accordingly, it is preferable that one capacitor 152 is connected in common to SEL drivers 163-1 to 163-$m$ of respective SEL lines 203-1 to 203-$m$.

The occurrence of streaking can be prevented if the switching by the FET 151 is not performed. However, it is difficult to improve PSRR in that case.

It is also possible to suppress both streaking and PSRR by separately providing a power source for SEL drivers or by forming a power source for stabilization in a chip. However, the number of components is increased in that case, which increases costs.

The embodiment of the present disclosure is not limited to the above-described embodiment and various modifications may occur within the scope not departing from the gist of the present disclosure.

The present disclosure can be applied to various image processing devices in addition to solid-state imaging devices such as the CMOS image sensor.

The present disclosure may be implemented as the following configurations.

(1) An image processing device including
a first storage unit storing electric charges outputted from a photodiode,
a reset unit resetting a voltage stored in the first storage unit,
a transfer unit transferring electric charges outputted from the photodiode to the first storage unit,
a switching unit switching a DC voltage supplied from a supply line of a pixel power source,
an output unit outputting the voltage stored in the first storage unit to a signal output line,
a second storage unit storing the DC voltage supplied through the switching unit, and
a drive unit driving the output unit by receiving the DC voltage stored by the second storage unit as a power source.

(2) The image processing device in which the switching unit is turned off before the reset is performed by the reset unit in a state of storing the DC voltage supplied from the supply line of the pixel power source and is turned on after the output of the voltage stored by the first storage unit to the signal output line is completed by the output unit.

(3) The image processing device in which the image processing device is a CMOS image sensor.

(4) An image processing method including
storing electric charges outputted from a photodiode by a first storage unit,
resetting a voltage stored in the first storage unit by the reset unit,
transferring electric charges outputted from the photodiode to the first storage unit by a transfer unit,
switching a DC voltage supplied from a supply line of a pixel power source by a switching unit,
outputting the voltage stored in the first storage unit to a signal output line by an output unit,
storing the DC voltage supplied through the switching unit by a second storage unit, and
driving the output unit by receiving the DC voltage stored by the second storage unit as a power source by a drive unit.

The present disclosure contains subject matter related to that disclosed in Japanese Priority Patent Application JP 2011-065825 filed in the Japan Patent Office on Mar. 24, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An image processing device comprising:
a first storage unit storing electric charges outputted from a photodiode;
a reset unit resetting a voltage stored in the first storage unit;
a transfer unit transferring electric charges outputted from the photodiode to the first storage unit;
a switching unit switching a DC voltage supplied from a supply line of a pixel power source;
an output unit outputting the voltage stored in the first storage unit to a signal output line;

a second storage unit storing the DC voltage supplied through the switching unit; and a drive unit driving the output unit by receiving the DC voltage stored by the second storage unit as a power source.

2. The image processing device according to claim 1, wherein the switching unit is turned off before the reset is performed by the reset unit in a state of storing the DC voltage supplied from the supply line of the pixel power source and is turned on after the output of the voltage stored by the first storage unit to the signal output line is completed by the output unit.

3. An image processing method comprising:
storing, by a first storage unit, electric charges outputted from a photodiode;
resetting, by a reset unit a voltage stored in the first storage unit;
transferring, by a transfer unit, electric charges outputted from the photodiode to the first storage unit;
switching, by a switching unit, a DC voltage supplied from a supply line of a pixel power source;
outputting, by an output unit, the voltage stored in the first storage unit to a signal output line;
storing, by a second storage unit, the DC voltage supplied through the switching unit; and
driving, by a drive unit, the output unit by receiving the DC voltage stored by the second storage unit as a power source.

4. An image processing device according to claim 1, wherein the second storage unit is configured to have a capacitance to store power as the power supply for driving the drive unit when the switching unit disconnects the second storage unit from the DC voltage supplied from the supply line.

5. An image processing device according to claim 1, wherein the second storage unit has a first terminal and a second terminal, the first terminal being connected to the switching unit and the drive unit, the second terminal being separate from the drive unit.

6. An image processing device according to claim 5, wherein the second storage unit is configured to have a capacitance to store power as the power supply for driving the drive unit when the switching unit disconnects the second storage unit from the DC voltage supplied from the supply line.

7. A CMOS image sensor comprising the image processing device according to claim 1.

8. The CMOS image sensor according to claim 7, wherein the switching unit is turned off before the reset is performed by the reset unit in a state of storing the DC voltage supplied from the supply line of the pixel power source and is turned on after the output of the voltage stored by the first storage unit to the signal output line is completed by the output unit.

9. The CMOS image sensor according to claim 7, wherein the second storage unit is configured to have a capacitance to store power as the power supply for driving the drive unit when the switching unit disconnects the second storage unit from the DC voltage supplied from the supply line.

10. The CMOS image sensor according to claim 7, wherein the second storage unit has a first terminal and a second terminal, the first terminal being connected to the switching unit and the drive unit, the second terminal being separate from the drive unit.

11. The CMOS image sensor according to claim 10, wherein the second storage unit is configured to have a capacitance to store power as the power supply for driving the drive unit when the switching unit disconnects the second storage unit from the DC voltage supplied from the supply line.

12. The method according to claim 3, wherein the switching unit is turned off before the reset is performed by the reset unit in a state of storing the DC voltage supplied from the supply line of the pixel power source and is turned on after the output of the voltage stored by the first storage unit to the signal output line is completed by the output unit.

13. The method according to claim 3, wherein the second storage unit is configured to have a capacitance to store power as the power supply for driving the drive unit when the switching unit disconnects the second storage unit from the DC voltage supplied from the supply line.

14. The method according to claim 3, wherein the second storage unit has a first terminal and a second terminal, the first terminal being connected to the switching unit and the drive unit, the second terminal being separate from the drive unit.

15. The method according to claim 14, wherein the second storage unit is configured to have a capacitance to store power as the power supply for driving the drive unit when the switching unit disconnects the second storage unit from the DC voltage supplied from the supply line.

* * * * *